United States Patent [19]

Mayhew et al.

[11] Patent Number: 4,815,819

[45] Date of Patent: Mar. 28, 1989

[54] METHOD FOR OBTAINING IMAGES FOR USE IN DISPLAYING A THREE-DIMENSIONAL ILLUSION AND RELATED IMAGE RECORDING MEDIUM

[75] Inventors: Christopher A. Mayhew, 6547 Tucker Ave., McLean, Va. 22101; Eric K. Pritchard, Bowie, Md.

[73] Assignee: Christopher A. Mayhew, McLean, Va.

[21] Appl. No.: 44,259

[22] Filed: Apr. 30, 1987

[51] Int. Cl.4 .................. G02B 27/22; G03B 35/00
[52] U.S. Cl. .................................. 350/144; 350/131; 350/320; 358/88; 358/89; 352/62
[58] Field of Search ............... 350/131, 130, 143, 320; 358/88, 92, 3, 22; 364/522; 340/723; 352/60, 62; 354/113, 112

[56] References Cited

U.S. PATENT DOCUMENTS

| | | |
|---|---|---|
| 765,980 | 7/1904 | Mercier . |
| 1,371,438 | 3/1921 | Prucha . |
| 1,966,092 | 7/1934 | Fried . |
| 2,002,090 | 5/1935 | Ives .................................. 350/131 |
| 2,158,660 | 5/1939 | Kanolt . |
| 2,168,273 | 8/1939 | Sauer et al. . |
| 2,279,443 | 4/1942 | Chanosky . |
| 2,313,561 | 3/1943 | Mainardi et al. . |
| 2,403,733 | 7/1946 | Mainardi et al. . |
| 2,545,465 | 3/1951 | Hough . |
| 2,630,737 | 3/1953 | Ramsdell . |
| 2,891,458 | 6/1959 | Grimal . |
| 3,598,032 | 8/1971 | Bohn et al. .................... 358/92 |
| 3,608,457 | 9/1971 | Barker . |
| 4,006,291 | 2/1977 | Imsand . |
| 4,062,045 | 12/1977 | Iwane .................................. 358/88 |
| 4,303,316 | 12/1981 | McElveen . |
| 4,418,993 | 12/1983 | Lipton . |
| 4,420,230 | 12/1983 | McElveen . |
| 4,429,328 | 1/1984 | Jones, Jr. et al. . |
| 4,528,587 | 7/1985 | Jones, Jr. . |

FOREIGN PATENT DOCUMENTS

| | | |
|---|---|---|
| N8959 | 8/1956 | Fed. Rep. of Germany . |
| 1251830 | 12/1960 | France .................................. 358/88 |
| WO83/04155 | 11/1983 | PCT Int'l Appl. .................... 358/88 |

OTHER PUBLICATIONS

The Focal Encyclopedia of Film and Television Techniques, Hastings House Publishers, New York, 1969, pp. 594, 673, 753 and 775–782.

Okoshi, "Three Dimensional Displays", Proceedings of the IEEE, vol. 68, May 1980, pp. 548, 562–563.

(List continued on next page.)

Primary Examiner—Jon W. Henry
Attorney, Agent, or Firm—Finnegan, Henderson, Farabow, Garrett & Dunner

[57] ABSTRACT

A method is provided for obtaining images for use in displaying a three-dimensional illusion which includes the step of obtaining first and second images of a subject volume having foreground and background portions with the points of origin of those images located in a first plane which includes left and right points of origin of an observer of the subject volume and which is normal to the optical axis of that observer. The first and second points of origin are also respectively located equidistant above and below a first line interconnecting the left and right points of origin and are located along a second line which is normal to and bisects the first line. The first and second optical axes are aligned to converge in a second plane parallel to the first plane which includes the foreground portion of the subject volume within the field of view of the observer which is closest to the first plane. A support apparatus is provided for using one or two imaging devices in implementing the method of the subject invention and an alternative support apparatus is disclosed which incorporates a teeter-totter arrangement to automatically provide for maintenance of convergence of the optical axes in the second plane upon adjustment of the effective first and second points of origin above and below the first line connecting the left and right points of origin of the observer. Image recording medium containing images produced by the above method is also disclosed.

12 Claims, 5 Drawing Sheets

OTHER PUBLICATIONS

Julesz, Foundations of Cyclopean Perception, University of Chicago Press, Chicago and London, 1971, pp. 2-3, 16, 19-21, 143-149, 183-185, 222-223 and 253-254.
Letter from Chris Mayhew to Leslie Leventman dated 11/13/85 (Exhibit A).
Letter from Chris Mayhew to Leslie Leventman dated 01/09/86 (Exhibit B).
Letter from Chris Mayhew to Leslie Leventman dated 02/05/86 (Exhibit C).
Mayhew, paper entitled, "True Three-Dimensional Animation in Motion Pictures", published in Proceedings of the Society of Photooptical Instrumentation Engineers—International Society of Optical Engineers, vol. 761, entitled, True Three-Dimensional Imaging Techniques and Display Technologies, Jan. 15-16, 1987, Los Angeles, CA (Exhibit D).

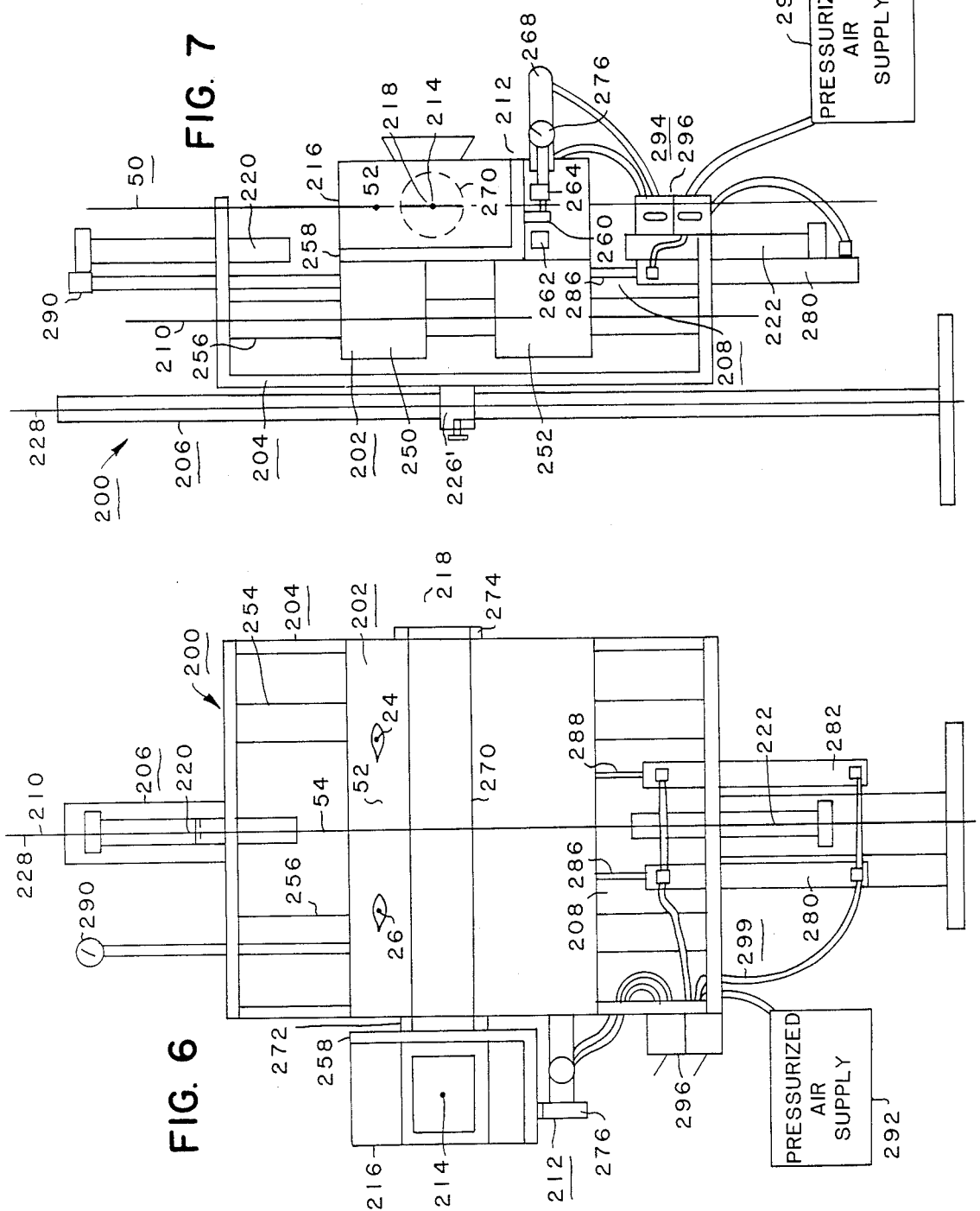

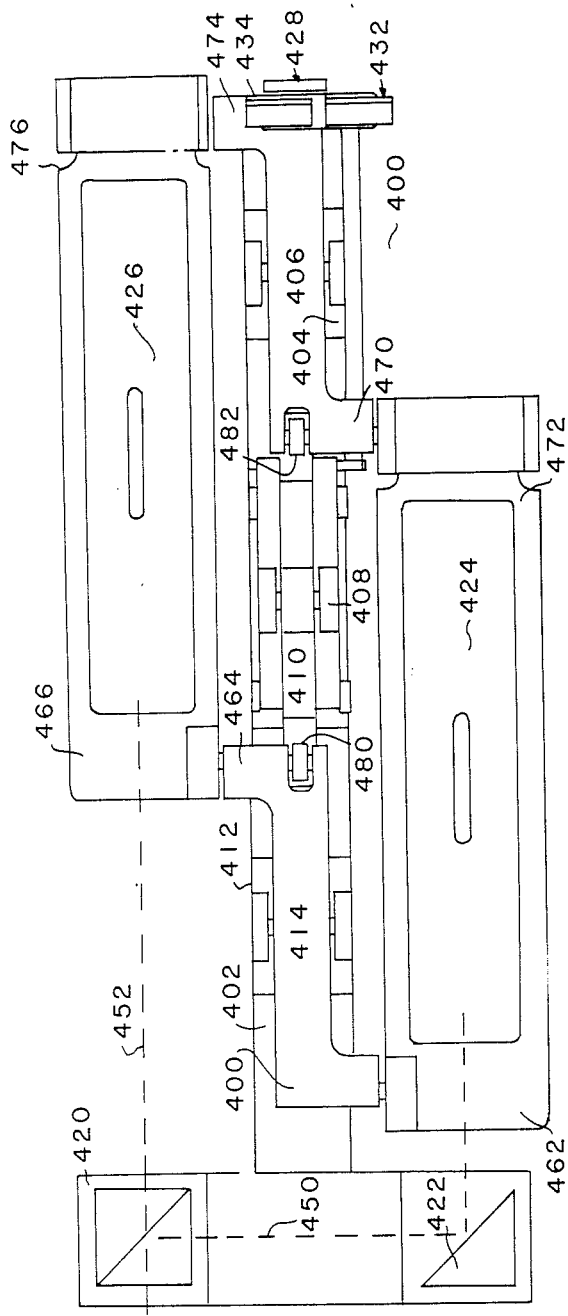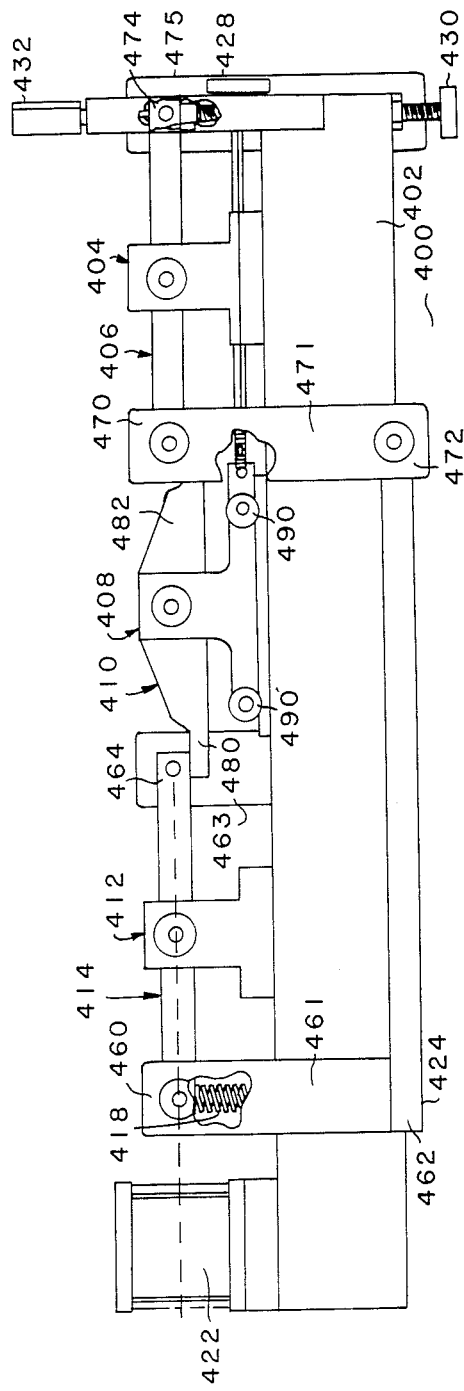
FIG. 9
FIG. 8

METHOD FOR OBTAINING IMAGES FOR USE IN DISPLAYING A THREE-DIMENSIONAL ILLUSION AND RELATED IMAGE RECORDING MEDIUM

BACKGROUND OF THE INVENTION

1. Field of the Invention

The present invention relates to a method and related apparatus for obtaining images for use in displaying a three-dimensional illusion of a subject volume having foreground and background portions as viewed by an observer having binocular vision. The related apparatus comprises a support apparatus for one or more imaging devices used to obtain images for displaying a three-dimensional illusion in accordance with the method of the present invention.

II. Background Information

Production of two-dimensional images which may be used to provide a three-dimensional illusion is a long outstanding goal in the visual arts field. The development of methods and related devices for producing such three-dimensional illusions has to some extent paralleled development in the field of physiology of depth perception. When viewing a scene naturally having depth, the human brain is believed to perceive depth for objects in the scene from a number of sources, called depth cues. Lighting effects, such as shading and color tones, can provide important depth information. In addition, perspective, overlapping and the relative size, texture, and angle or gradient of objects in the scene may provide depth information. The relative motion of the objects may also allow the brain to perceive depth.

Another important depth cue is parallax, i.e., depth information provided by comparing the images of the same scene from each eye. The distance between the center points or irises of the eyes for an average human being, generally referred to as the interocular distance, is approximately 65 millimeters. Behind the iris of each eye is a planar retina. The retina receives light from the subject volume and forms a two-dimensional image of the subject volume. The two-dimensional image at each retina is transferred to the brain by electrical impulses. The brain is then believed to iteratively compare the two-dimensional images to obtain a single image of the subject in which the various objects in the subject appear to have depth. The rate of comparison in the brain of the two-dimensional images formed at the retina, generally referred to as the visio-psychological suppression or memory rate, appears to be approximately eight to ten times per second.

This process of obtaining a three-dimensional illusion of a subject volume is referred to as the process of binocular vision originating at left and right points of origin, namely the left and right eyes of a human observer.

Various approaches have been used in the past to obtain images having the appearance of depth. One commonly used approach is to obtain images from a scene from two horizontally displaced viewing points or points of origin. The horizontal displacement of the points of origin is generally equal to or less than the interocular distance. Images obtained from these two points of origin are simultaneously superposed on a projection screen, but the light forming these images is polarized differently for the images from the left point of origin than for images from the right point of origin. Accordingly, it is necessary for the observer to wear glasses having approximately polarized lenses. While this method produces images perceived by the viewer as having depth, the extent of the field, referred to herein as depth quality, tends to be overly exaggerated and often results in discomfort to the viewer. The necessity of wearing glasses having polarized lenses is inconvenient. In addition, the necessity of projecting multiple images having differing polarization makes it difficult or impossible to use conventional electronic or mechanical projection equipment.

A similar approach used in the past involved obtaining images from horizontally displaced left and right points of origin, as described above, and projecting those images alternately rather than simultaneously. An example of such a system is disclosed in U.S. Pat. No. 4,303,316 issued to McElveen. U.S. Pat. No. 4,006,291, issued to Imsand, adopts a form of this approach in which images from one point of origin are primarily used while images from another point of origin are periodically inserted.

More recently, approaches using vertical alignment of the viewing points, generally referred to as vertical parallax, have been proposed. An example of a vertical parallax system is disclosed in U.S. Pat. No. 4,429,328, issued to Jones, Jr., et al. Empirical evidence shows that the vertical parallax approach produces the appearance of depth while being more amenable or comfortable to the viewer.

A principle drawback of the use of alternating images from two viewing points, whether using the horizontal or vertical displacement approaches, is that slowly moving or stationary objects in the scene being viewed tend to move or rock as the point of origin alternates. This rocking phenomenon is attributable to the different viewing angles corresponding to the respective points of origin.

Accordingly, it is an object of the present invention to provide a method for obtaining images for use in displaying a three-dimensional illusion of a subject volume and related apparatus for producing enhanced depth images, having reduced motion (rocking) effects.

Additional objects and advantages of the invention will be set forth in the description which follows and in part will be obvious from the description or may be learned by practice of the invention.

SUMMARY OF THE INVENTION

To achieve the foregoing objects and in accordance with the purpose of the invention as embodied and broadly described herein, a method for obtaining images for use in displaying a three-dimensional illusion of a subject volume having foreground and background portions as viewed by an observer having an optical axis directed toward the volume and having binocular vision originating at left and right points of origin is provided which comprises the steps of: (a) obtaining a first image of the volume as viewed along a first optical axis having a first effective point of origin; and (b) obtaining a second image of that volume as viewed along a second optical axis having a second effective point of origin. These effective first and second points of origin are located in a first plane which includes the left and right points of origin and which is normal to the optical axis of the observer. The first and second effective points of origin, respectfully, are located equidistant above and below a first line connecting the left and right points of origin and located along a second line which is normal to and bisects the first line. The first and second optical axes are aligned to converge in a second plane parallel to the first plane which second plane includes the foreground portion of the subject volume within the field of view of the observer which is closest to the first plane. Preferably, the method of the subject invention includes the step of repeating the above-mentioned steps of obtaining the first and second images while maintaining the first and second optical axes converged in the second plane, with the second plane remaining stationary or moving as a result of change in position of the foreground portion of the subject volume which is closest to the first plane. It is also preferable that the first and second images both be focused in the subject volume in a third plane located parallel to and beyond the second plane.

In addition, the present invention is directed toward a support apparatus for an imaging device used to obtain images in accordance with the above-described method. Specifically, one embodiment of this support apparatus comprises a bracket for holding an imaging device, and positioning means (i) for locating the bracket in a first position wherein the point of origin of the imaging device is located in a first plane which includes the left and right points of origin and which is normal to the optical axis of the observer, and wherein the point of origin of the imaging device is located a first distance above a first line connecting the left and right points of origin, and the point of origin of the imaging device is located along a second line which is normal to and bisects the first line, (ii) for locating said bracket in a second position wherein the point of origin of the imaging device is located in the first plane and wherein that point of origin is located along the second line a second distance below the first line equal to the first distance, and (iii) for rotating the bracket about a third line which is parallel to the first line and which passes through the optical axis of the imaging device, preferably at the point of origin of that device, to align the optical axis of the imaging device with the bracket in the first position and the optical axis of the imaging device with the bracket in the second position to converge with each other and with the optical axis of the observer in a second plane parallel to the first plane. The second plane includes the foreground portion of the subject volume within the field of view of the observer which is closest to the first plane.

In a more specific preferred embodiment, the support apparatus of the subject invention includes first and second brackets for holding first and second imaging devices; optical means for altering the path of at least one of the first and second optical axes of the imaging devices to form respective first and second effective points of origin for these first and second optical axes and corresponding effective first and second optical axes; and positioning means (i) for locating the first bracket in a first position wherein the first effective point of origin of the first imaging device is located in a first plane which includes the left and right points of origin and which is normal to the optical axis of the observer, and wherein the first effective point of origin of the first imaging device is located a first distance above a first line connecting the left and right points of origin and the first effective point of origin of the first imaging device is located along a second line which is normal to and bisects the first line, (ii) for angling the first bracket to result in effective rotation of the first effective optical axis about first effective rotation axis which lies in the first plane and which is parallel to the first line and passes through the first effective optical axis of the first imaging device, preferably at the first effective point of origin, to cause the first effective optical axis of the first imaging device at the first position to converge with the optical axis of the observer at a convergence point in a second plane parallel to the first plane, the second plane including the foreground portion of the subject volume within the field of view of the observer which is closest to the first plane, (iii) for holding the second bracket in a second position wherein the second effective point of origin of the second imaging device is located in the first plane and wherein the second effective point of origin of the second imaging device is located along the second line a second distance below the first line equal to the first distance, and (iv) for angling the second bracket to result in effective rotation of the second effective optical axis about a second effective rotational axis which is parallel to the first line and passes through the second effective optical axis of the second imaging device, preferably at the second effective point of origin, to cause the second effective optical axis of the second imaging device at the second position to converge with the first effective optical axis and the optical axis of the observer at the afore-mentioned convergence point in the second plane.

More specifically, the first bracket preferably includes a first platform for supporting the first imaging device and the second bracket includes a second platform for supporting the second imaging means. The support apparatus also preferably comprises a base member; first pivoting means, having a base mounted on the base member and having a pivot arm connected at a first end to a first end of the first platform located closest to the subject volume and connected at a second, opposite end to a first end of the second platform located closest to the subject volume, for simultaneously angling the first platform in one direction and angling the second platform in a corresponding but opposite direction; second pivoting means, having a base mounted on the base member and having a pivot arm connected at a first end to a second end of the first platform located furthest from the subject volume and connected at a second, opposite end to a second end of the second platform located furthest from the subject volume, for simultaneously angling the first platform in one direction and the second platform in a corresponding opposite direction; third pivoting means, movably mounted on the base member and having a pivot arm in contact at a first end to that end of the pivot arm of the first pivoting means coupled to the first end of the second platform and in contact at a second end to that end of the pivot arm of the second pivot means coupled to the second end of the first platform, for translating pivotal movement of one of the first and second pivoting means to the other of the first and second pivoting means, with the relative magnitude of the pivotal movement determined by the position of the third pivoting means relative to the base member; means for adjusting the first and second distances in equal amounts comprising means coupled to the base member and to at least one of the first and second pivoting means for selectively pivoting that pivoting means; and means for adjusting the location of the convergence point of the first and second optical axes comprising means for selectively moving the third pivoting means along the base member.

BRIEF DESCRIPTION OF THE DRAWINGS

FIG. 6 is a front view of an alternative embodiment of a support apparatus incorporating the teachings of the subject invention;

FIG. 7 is a side view of the support apparatus illustrated in FIG. 6;

FIG. 8 is a side view of a still further embodiment of the support apparatus incorporating the teachings of the subject invention;

FIG. 9 is a top view of the support apparatus illustrated in FIG. 8; and

DESCRIPTION OF THE PREFERRED EMBODIMENT

Figure 1:
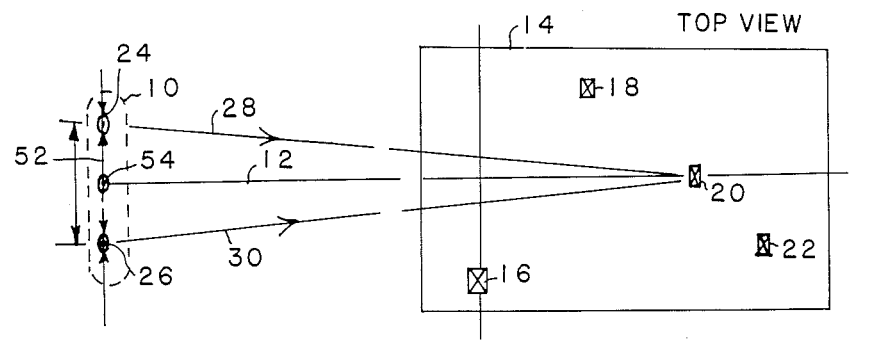
FIG. 1 is a top view of an observer having an optical axis directed toward a subject volume and having binocular vision originating at left and right points of origin.

Reference will now be made in detail to the present preferred embodiment of the subject invention as illustrated in the accompanying drawings, wherein like reference characters designate like or corresponding parts throughout.

The method of the subject invention permits images to be obtained for use in displaying a three-dimensional illusion of a subject volume having foreground and background portions as viewed by an observer having an optical axis directed toward the volume and having binocular vision originating at left and right points of orgin. FIG. 1 is an illustration of a top view of an observer 10 having an optical axis 12 directed toward a subject volume 14. Subject volume 14 has foreground portions 16, 18 and background portions 20, 22 as viewed by observer 10. Observer 10 is illustrated as having binocular vision originating at a left point of origin 24 and a right point of origin 26. The optical axis 12 of observer 10 may be directed at either foreground or background portions of subject volume 14, and the indication in FIG. 1 that optical axis 12 is directed toward background portion 20 is by way of example and not limitation. In any event, optical axes 28 and 30 of points of origin 24 and 26 converge with optical axis 12 at a portion of subject volume 14 under principal observation of observer 10. In addition to convergence of optical axes 12, 28 and 30 at background portion 20, observer 10 operates to also focus at the point of convergence, namely background portion 20.

Figure 2:
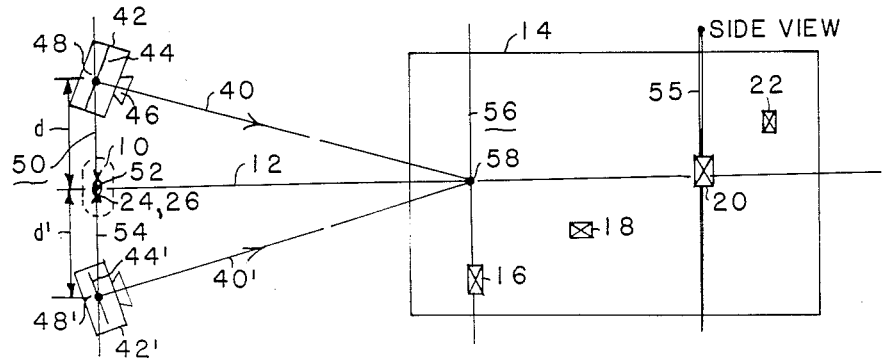
FIG. 2 is a schematic illustration of a method of obtaining images for use in displaying a three-dimensional illusion of a subject volume in accordance with the teachings of the subject invention.

The method of the subject invention comprises a first step of obtaining a first image of a subject volume as viewed along a first optical axis having a first point of origin. In tis regard, attention is directed toward FIG. 2 which is a side view of subject volume 14 illustrated in FIG. 1. In FIG. 2, subject volume 14 is illustrated from a side view again containing foreground portions 16 and 18 and background portions 20 and 22. A comparison of the top view of subject volume 14 in FIG. 1 and the side view of subject volume 14 in FIG. 2 provides an indication of the three-dimensional positioning of foreground and background portions 16, 18, 20, and 22.

As noted above, the first step of the method of the subject invention involves obtaining a first image of the volume as viewed along a first optical axis having a first effective point of origin. As illustrated in FIG. 2, a first image of subject volume 14 is obtained as viewed along a first optical axis 40 of imaging device 42. Imaging device 42 may, for example, comprise a still photographic camera. However, in the alternative, imaging device 42 may comprise any form of image producing device, such as a film camera or a video camera. As used throughout, the term "optical axis" of an imaging device comprises a straight line extending from the foremost optical mechanism used in connection with that imaging device toward the subject volume. In addition, the "effective" optical axis of an imaging device includes any extension of the optical axis of that device from the foremost optical mechanism associated with that device backwards away from the subject volume. The "actual" optical axis of an imaging device as the term is used herein inclucles the actual optical path of the imaging device behind the foremost optical mechanism of the device in a direction away from the subject volume. The "actual" point of origin of an imaging device is the actual physical location of the imaging plane of an imaging device where the "actual" optical axis of that imaging device intersects the imaging plane of that device. The "effective" point of origin of an optical axis of an imaging device is the point along the "effective" optical axis of that device which is the same optical distance behind the foremost optical mechanism associated with that device, as exists along the "actual" optical axis of that device from that optical mechanism to the actual point of origin of that imaging device. Thus, the "effective" point of origin of an imaging device will coincide with the "actual" point of origin of an imaging device if no optical mechanism were interposed along the optical axis of that device. However, if a beam splitter, a mirror or other form of optical axis direction-altering device is inserted along the optical axis of the imaging device to alter the direction of that optical axis, the "effective" point of origin of that imaging device would no longer necessarily coincide with the "actual" point of origin of that imaging device.

In FIG. 2, an imaging device 42 is illustrated which has an imaging plane 44 located normal to and centered with optical axis 40. Imaging device 42 has an optical mechanism 46 in the form of a lens intersecting optical axis 40. However, in the illustrated embodiment of FIG. 2, optical mechanism 46 does not in any way alter the linear nature of optical axis 40. Accordingly, the point of intersection of optical axis 40 with the center of image plane 42 defines a point of origin 48 which is both the "effective" point of origin and the "actual" point of origin of imaging device 42. Imaging device 42 may thus be employed to obtain a first image of subject volume 14 as viewed along a first optical axis 40 having a first effective point of origin 48.

Further iri accordance with the method of the subject invention, there is provided the step of obtaining a second image of the subject volume as viewed along a second optical axis having a second effective point of origin. As illustratively shown in FIG. 2, a second imaging device 42' has a second optical axis 40' and a second effective point of origin 48'. Imaging device 42' may, in fact, be a separate distinct device from imaging device 42 or, in the alternative, may simply comprise imaging device 42 located in a second position to thereby obtain a second image of subject volume 14 as viewed along the second optical path 40' having a second point of origin 48'.

Further, in accordance with the teachings of the subject invention, the above-mentioned first and second points of origin are located in a first plane which includes the left and right points or origin of a hypothetical observer viewing a subject volume, with the first and second points of origin respectfully located equidistant above and below a first line connecting the left and right points of origin and located along a second line which is normal to and bisects the first line, and with the first and second optical axes aligned to converge in a second plante parallel to the first plane, with the second plane including the foreground portion of the subject volume within the field of view of the observer which is closest to the first plane. As illustrated in FIG. 2 by way of example and not limitation, first and second points of origin 48 and 48' are located in a first plane 50 which includes left and right points of origin 24 and 26. Plane 50 is normal to optical axis 12 of observer 10. Points of origin 48 and 48' are respectively located a first distance d and a second distance d' above and below a first line 52 (see FIG. 1) connecting left and right points of origin 24 and 26. Distances d and d' are equal, as illustrated in FIG. 2. In addition, points of origin 48 and 48' are located along a second line 54 which is normal to and bisects first line 52 (see FIG. 2).

Furthermore, as is also illustrated in FIG. 2 by way of example and not limitation, optical axes 40 and 40' are aligned to converge in a second plane 56 which is parallel to first plane 50 and which second plane 56 includes the foreground portion 16 of subject volume 14 within the field of view of observer 10 which is closest to first plane 50.

The method of the subject invention as described above incorporates several important features which serve to enhance the depth quality of the resultant image and significantly reduce keystoning effects.

The requirement that the effective first and second points of origin be respectively located equidistant above and below a first line connecting the left and right points of origin and located along a second line which is normal to and bisects the first line is one such feature. As noted above, disparity, whether horizontal or vertical, is largely responsible for adding parallax to visual images. Portions of subject volumes having essentially flat surfaces produce images which appear flat and two-dimensional. Changes in the viewing perspective do not change the appearance of these portions. Portions of a subject volume naturally having depth when viewed directly, however, do change their appearance or, more specifically, their position and aspect, as the viewing perspective is changed. Changes in the viewing perspective create corresponding edges on the image which do not perfectly match when the images are superimposed. Alternative displays of these images create contrast at these edges which is perceptable to the brain as depth.

Vertical parallax is preferred to horizontal parallax because the brain has been found to be more sensitive to horizontal motion, i.e., horizontal motion is more noticeable. But vertical parallax generally creates some noticeable vertical rocking motion effects nevertheless.

Among other reasons, keystoning effects can arise from variations in the size of objects appearing in the image. The size of the object in an image depends in part on the distance between the object and the imaging plane. Selecting the points of origin to be equidistant above and below a first line connecting the left and right points of origin and located along a second line which is normal to and bisects the first line maintains these points of origin at equal distances from portions of the subject volume along the optical axis of the observer, and results in first and second images of the subject volume which, when superimposed one upon the other in the manner taught in U.S. Pat. No. 4,429,328 issued to Jones et al, Jr., (the contents of which are hereby expressly incorporated by reference), produce an apparent illusion of depth based on parallax, and not on size variation introduced by differing image distances. This can be seen in FIG. 1 by noting that distance d plus d' (the distance between points of origin 48 and 48' along line 54) forms the base of an isosceles triangle, the legs of which are equal length optical axes 40 and 40'.

The features of the subject invention described above which require the first and second points of origin to be maintained in the above-defined first plane, the first plane including the left and right points of origin and being normal to the optical axis of the observer, in effect requires tilting of the imaging devices an equal and opposite amount about axes of rotation which intersect the effective optical axes of the imaging devices, preferably at the effective points of origin of the imaging devices, and which are parallel to the first line connecting the left and right points of origin. In effect, this feature may be identified as requiring the imaging device to be rotated in a manner which maintains the length of the effective optical axes of both imaging devices equal.

The feature of maintaining the first and second points of origin in the first plane is not obtained through utilization of a standard tripod which results in tilting of an imaging device such as a camera, along the base of that device. If, for example, such a tripod were utilized in connection with the arrangement shown in FIG. 2, imaging device 42 would be tilted along the base, thereof, resulting in point of origin 48 being thrusted in front of plane 50 at a point above optical axis 42 a distance less than d. Likewise, use of such a tripod to achieve the requisite angling of imaging device 42' would result in positioning of point of origin 48' behind plane 50 at a distance from optical axis 12 which is greater than distance d'. Accordingly, the resultant optical path 40 would be shorter than the resultant optical path 40', which causes the undesirable effect of keystoning. In addition, use of a prior art tripod would result in both the top and bottom of imaging plane 44 being closer to second plane 56, and both the top and bottom of imaging plane 44' of imaging device 48' being located behind plane 50 further away from second plane 56. Thus, the angling of imaging devices 42 and 42' using a prior art tripod would result in a substantially less sharp composite image having less depth quality that the method taught and claimed herein.

Still further, placement of the convergence point of the first and sedond optical axes in a second plane which includes the foreground portion of the subject volume within the field of the observer which is closest to the first plane is also an important feature of the subject invention. By directing both optical axes at such a convergence point, differences in the image at that point are essentially limited to depth aspects. However, the disparity of the imaging locations will cause movement of objects in the foreground and background relative to the convergent point. It has been discovered that the brain recognizes or notices movement of objects in the foreground more than movement of optics in the background. As a consequence, the convergent point of the subject invention is fixed in the plane of the foreground portion of the subject volume closest to the first plane to thereby minimize movement of objects in the foreground while tolerating the less recognizable movement of objects in the background.

Specifically, as illustrated in FIG. 2, convergent point 58 of optical axes 40 and 40' is set to coincide with optical axis 12 in second plane 56 which also includes foreground portion 16 of subject volume 14 within the field of view of observer 10 which is closest to first plane 50. It should be understood that convergence point 58 must be relocated if foreground portion 16 moves or if a new foreground portion enters the scene nearer to first plane 50. It should also be understood that discontinuities in a scene within the subject volume 14, such as a ground plane, may be considered to be foremost portion 16 for purposes of positioning convergence point 58.

This requirement of positioning the convergence point in the above-identified second plant does not require focusing on that convergence point. In fact, unless the foreground portion in the second plane is the center of attention of the field of view, the focus point of the first and second images will typically not coincide with the convergence point of the first and second axes in accordance with the teachings of the subject invention. Instead, the first and second images are focused in a third plane 55 in the subject volume parallel to and located beyond the second plane.

As noted above, the first and second images obtained in accordance with the teachings of the subject invention preferably are sequentially displayed on a viewing surface from the first point of origin and then, time displaced, from the second point of origin in accordance with the teachings of the Jones et al. patent, namely at a rate within a range of 4 to 30 changes between said first and second points of origin per second. This rate is generally referred to as the time displacement rate. It is also preferable that the step of displaying include altering the rate of changes, preferably as a function of the content of the scene. Accordingly, a series of first and second images may be taken at a rate of, for example, 8 changes between the first and second points of origin per second, followed by a sequence of first and second images having 10 or 12 changes between the first and second points of origin per second.

It is still further preferable that the method of the subject invention include the step of repeating the process of obtaining the first and second images while maintaining the first and second optical axes converged in the second plane. This step provides for the display of a three-dimensional illusion of a subject volume including movement.

It is still further preferable that the method of the subject invention include the step of altering the vertical disparity, i.e., the equal distances d and d', upon relative movement between the first plane and portions of the subject volume beyond the second plane. Generally, the distance between the first plane and the portions of the subject volume beyond said second plane increases, the equal distances of the first and second points of origin above and below the first line may be increased, whereas these distances are preferably decreased as the distance between the first plane and the portions of the subject volume beyond the second plane is decreased.

Furthermore, the method of the subject invention preferably includes the step of altering the equal distances of the first and second points of origin above and below the first line upon a change in the degree of relative movement between objects in the subject volume. As the degree of relative movement increases, the equal distances may be increased, whereas as the degree of relative movement decreases, the magnitude of the equal distances is preferably decreased.

It is still further preferable that the magnitude of the equal distances between the first and second points of origin above and below the first line be altered upon a change in the distance between the first and second planes. As the distance between the first and second planes is increased, these distances are preferably increased, whereas when the distance between the first and second plane is decreased, these distances are preferably decreased.

As noted above, the time displacement rate can also be used as a parameter in the method of the present invention. As described above, the brain compares images from the left and right eyes at the viseo-phychological memory rate, typically 8 to 10 times per second. The time displacement rate of the subject invention is preferably selected to coincide with this rate as noted in the Jones, Jr. et al. patent. By providing the eyes of the observer with alternating images which differ in vertical parallax and are time displaced to coincide with the persistance of the visual memory of the viewer, i.e., the viseo-psychological memory rate, depth information is provided to the observer in a form that is naturally translated into a three-dimensional image by the brain. Where the time displacement rate is lower than the viseo-psychological memory rate, a noticeable rocking of the objects, particularly relative stationary objects, may occur and depth quality is substantially diminished. This is because the images from a given imaging location are allowed to persist in the brain rather than blending to form a depth-enhanced composite image. Time replacement rates faster than the viseo-psychological memory rate cause depth quality to become less perceptible until, at a rate of approximately 30 changes per second, depth quality is effectively lost. Preferably, three principle variables as described above—disparity (namely the distance of the first and second points of origin above and below the first line), convergence point, and time displacement—are adjusted in a coordinated fashion to obtain desirable depth quality in relationship to relative movements between the first and second planes and between objects in the subject volume beyond the second plane.

It should be noted that the principles of the invention as thus far described may also be applied to computer-generated graphics wherein the first and second images are computer generated in accordance with the teachings of the subject invention as set forth above.

It should also be noted that the subject invention includes an image recording medium, such as film, video tape, laser disc, computer memory and the like, upon which first and second images are recorded or stored in accordance with the method of the subject invention.

The subject invention also includes an apparatus for implementing the above-described methods. Specifically, the subject invention is directed to a support apparatus for an imaging device used to obtain images for displaying a three-dimensional illusion of a subject volume having foreground and background portions as viewed by an observer having an optical axis directed toward that volume and having binocular vision originating at left and right points of origin, the imaging device being adapted to obtain images of the volume as viewed along an optical axis having an effective point of origin.

The support apparatus of the subject invention comprises a bracket for holding the imaging device, and positioning means for positioning the image device in a specific manner, namely: (i) locating the bracket in a first position wherein the point of origin of the imaging device is located in a first plane which includes the left and right points of origin and which is normal to the optical axis of the observer and wherein the point of origin of the imaging device is located a first distance above a first line connecting the left and right points of origin and the point of origin of the imaging device is located along a second line which is normal to and bisects the first line, (ii) locating the bracket in a second position wherein the point of origin of the imaging device is located in the first plane and wherein the point of origin of the imaging device is located along the second line a second distance below the first line equal to the first distance, and (iii) rotating the bracket about a third line which is parallel to the first line and passes through the effective optical axis of the imaging device, preferably at the effective point of origin, to align the optical axis of the imaging device with the bracket in the first position and the optical axis of the imaging device with the bracket in the second position to converge with each other and with the optical axis of the observer in a second plane parallel to the first plane, which second plane includes the foreground portion of the subject volume within the field of view of the observer which is closest to the first plane.

Figure 3:
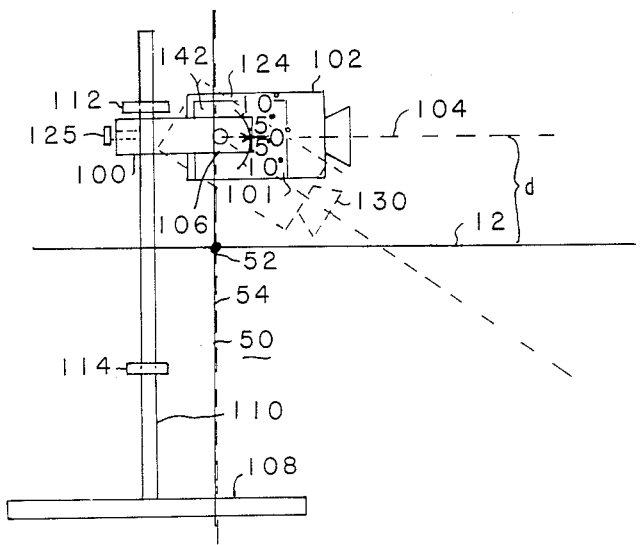
FIG. 3 illustrates a side view of a support apparatus incorporating the teachings of the subject invention.
Figure 4:
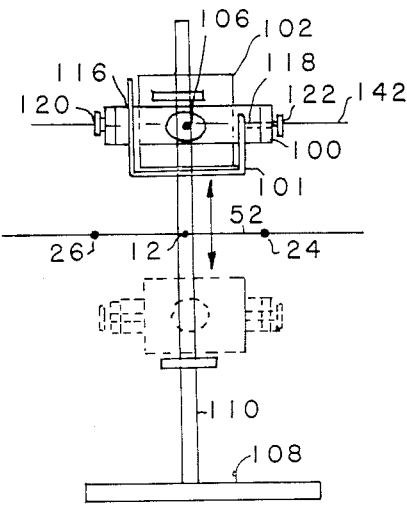
FIG. 4 illustrates a side view of the support apparatus shown in FIG. 3.

FIG. 3 provides a side view of a support apparatus incorporating the teachings of the subject invention and FIG. 4 provides a front view of that support apparatus. As shown in FIGS. 3 and 4, support arms 100 and bracket 101 are provided for holding an imaging device 102 which has an optical axis 104 and an effective point of origin 106. FIGS. 3 and 4 further illustrate a base 108, a vertical support 110, stops 112 and 114, half shafts 116 and 118, locks 120 and 122, indicator 124, and lock 125. Vertical support 110 is mounted to base 108 whereas stops 112 and 114 are mounted on vertical support 110. Half shafts 116 and 118 are mounted on support arms 100 and extend to respective sides of bracket 101 thrugh corresponding openings in support arms 100. Locks 120 and 122 prevent relative rotation of shafts 116 and 118 and support arms 100. Indicator 124 includes a pointer on one of support arms 100 and an angular scale appearing on bracket 101 to which the pointer is directed, thereby measuring the angular displacement of bracket 101 relative to support arms 100. Lock 125 selectively prevents relative movement of support arms 100 and vertical support 110.

Figure 5:
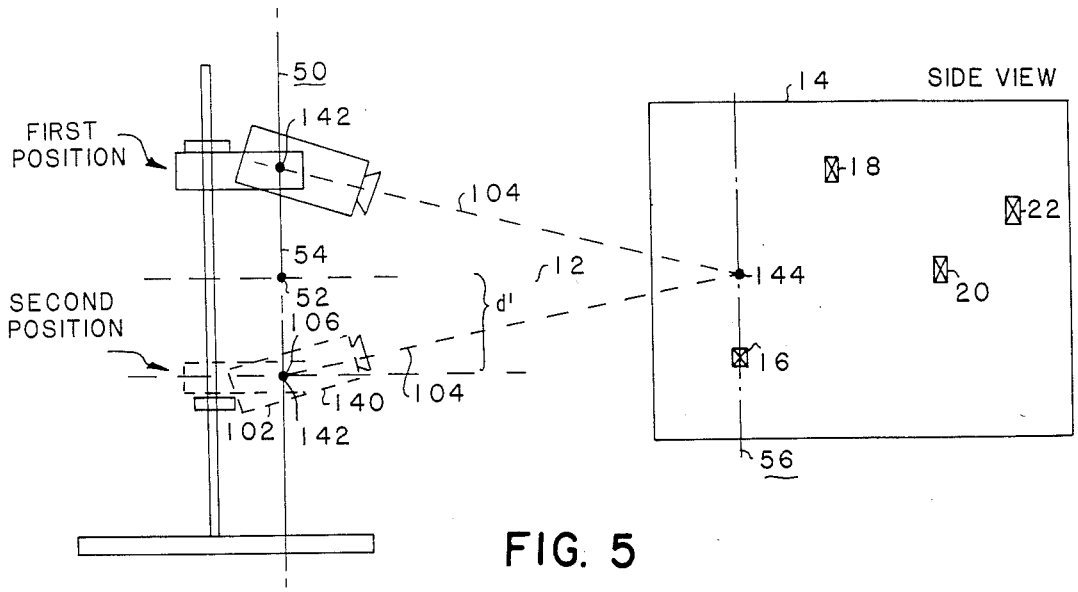
FIG. 5 is an illustration of a side view of the support apparatus of FIG. 3 showing both the first and second positions of an imaging device which may be obtained by a support incorporating the teachings of the subject invention.

The support apparatus illustrated in FIGS. 3 and 4 employs the use of half shafts 116 and 118 to permit rotation of bracket 101 and imaging device 102 about point of origin 106 thereof. This arrangement is fundamentally different from prior art arrangements wherein imaging devices were rotated or tilted about the base of that device and not about the point of origin of that device. By providing a support which permits tilting of imaging device 124 about the point of origin of the optical axis of that device, the support of the subject invention readily facilitates implementation of the method of the subject invention described above. In this regard, the distance between stops 112 and 114 is selected to be the sum of the distances the first and second points of origin are respectfully located above and below a first line interconnecting the left and right points of origin. Specifically, the combination of support arms 100, base 108, vertical support 110, stops 112, 114, shafts 116, 118 and locks 120, 124 provides a mechanism for locating bracket 101 in a first position, as illustrated in FIG. 3 by outline 130, wherein point of origin 106 of imaging device 102 is located in a first plane 50 which includes the left and right points of origin 24 and 26 (see FIG. 4) and which is normal to the optical axis 12 of the observer, and wherein the point of origin 106 of imaging device 102 is located a first distance d above a first line 52 connecting left and right points of origin 24, 26, and the point of origin 106 of imaging device 102 is located along a second line 54 which is normal to and bisects the first line 52. The combination of these elements also provides a mechanism for locating bracket 101 in a second position, illustrated by outline 140 in FIG. 5, wherein point of origin 106 of imaging device 102 is located in first plane 50 along second line 54 a second distance d' below first line 52, wherein d' is equal to d, and for rotating bracket 101 about a third line 142 in first plane 50 which is parallel to first line 52 and which passes through point of origin 106 of imaging device 102 to align optical axis 104 of imaging device 102 with bracket 101 in the first position and the optical axis 104 of imaging device 102 with bracket 101 in the second position to converge with each other and with optical axis 12 of the observer at point 144 in a second plane 56, this second plane including the foreground portion 16 of subject volume 14 within the field of view of the observer which is closest to first plane 50.

A more detailed embodiment of the support apparatus of the subject invention is illustrated in FIGS. 6 and 7. As shown in FIGS. 6 and 7, a support apparatus 200 is provided which comprises a first frame 202, a second frame 204, and a third frame 206. In addition, support apparatus 200 comprises a mechanism 208 for moving first frame 202 along a longitudinal axis 210 of second frame 204. First frame 202 includes a mount 212 to rotate imaging device 216 about a line 218 which lies in first plane 50, which is parallel to line 52 and which passes through point of origin 214 of imaging device 216. Furthermore, second frame 204 includes first and second stops 220 and 222 movably positionable to limit relative movement of first and second frames 202, 204 to twice the first distance d (or twice the second distance d') as defined above.

Support apparatus 200 includes a mechanism 226 for moving second frame 204 along the longitudinal axis 228 of third frame 206 to move line 52 in a direction parallel to line 54 as defined above.

Specifically, as illustrated in FIGS. 6 and 7, first frame 202 includes slide blocks 250, 252, while second frame 204 includes guide shafts 254, 256. Slide blocks 250, 252 are dimensioned to fit over and slide upon guide shafts 254, 256. Mount 212 includes a bracket 258 and bracket flange 260, rear stop 262 and forward stop 264. A pneumatic cylinder 268 is provided to impart rotational movement to bracket 258, and thus to imaging device 216, around the axis of a shaft 270. Shaft 270 is rotatably mounted to first frame 202 by bearing housings 272 and 274. A micrometer 276 measures the amount of rotation imparted by pneumatic cylinder 268.

Pneumatic cylinders 280 and 282 are coupled to second frame 204 and have piston rods 286, 288 which engage first frame 202 and operate to selectively move first frame 202 between stops 220 and 222. Stops 220 and 222 may comprise bolts threaded through corresponding openings in the upper and lower portions of first bracket 202. The location of first bracket 202 relative to second bracket 204 is indicated by micrometer 290. A pressurized air supply 292 provides pressurized air through pneumatic hoses 294 to cylinders 268, 280 and 282. Control of this pressurized air is achieved through operation of inlet valves 296.

A still further embodiment of the support apparatus of the subject invention is illustrated in FIGS. 8 and 9. Specifically, FIGS. 8 and 9 show a support apparatus 400 which comprises base member 402, rear disparity pivot 404, rear disparity pivot lever arm 406, convergence pivot truck 408, convergence lever arm 410, front disparity pivot 412, front disparity lever arm 414, preloaded spring 418, beam splitter 420, mirror 422, left camera tray 424, right camera tray 426, convergence adjustment 428, disparity adjustment 430, convergence indicator 432, and disparity indicator 434.

Beam splitter 420 and mirror 422 in combination provide a mechanism for altering the path of at least one of first and second optical axes of respective first and second imaging devices which are to be positioned on respective left and right camera trays 424 and 426. The combination of beam splitter 420 and mirror 422 form respective first and second effective points of origin for the first and second optical paths of the imaging devices to be supported on camera trays 424 and 426. The distance between the optical center of beam splitter 420 and the optical center of mirror 422 coincides with the distance by which left camera tray 424 is offset ahead of right camera tray 426. Accordingly, the actual optical axes 450 and 452 of the imaging devices to be placed on camera trays 424 and 426, respectively, are identical in length. Thus, the effective points of origin of these imaging devices in fact coincide with the actual point of origin of the imaging device to be placed on right camera tray 426.

In addition to supporting beam splitter 420 and mirror 422, base member 402 supports rear disparity pivot 404, convergence pivot truck 408, and front disparity pivot 412. Rear disparity pivot 404 in turn pivotably supports rear disparity lever arm 406, convergence pivot truck 408 pivotably supports convergence lever arm 410, and front disparity pivot 412 pivotably supports front disparity lever arm 414. A first end 460 of front disparity lever arm 414 is connected to a first end 462 of left camera tray 424 locted closest to the subject volume by means of a first support 461. Front disparity lever arm 414 is connected at a second, opposite end 464 to a first end 466 of right camera tray 426 located closest to the subject volume by means of a second support 463. Accordingly, the combination of front disparity pivot 412, front disparity lever arm 414, and supports 461 and 463 operate to simultaneously angle left camera tray 424 in one angular direction and right camera tray 426 in a corresponding opposite direction in response to pivoting of front disparity lever 414.

Rear disparity lever arm 406 is connected at a first end 470 by means of a first support 471 to a second end 472 of left camera tray 424 located furthest from the subject volume, and is connected at a second opposite end 474 by a second support 475 to a second end 476 of right camera tray 426 located furthest from the subject volume. Rear disparity pivot 404 in combination with rear disparity lever arm 406 and supports 471 and 475 operate to simultaneously angle left camera tray 424 in one direction and right camera tray 426 in a corresponding opposite direction in response to pivoting of rear disparity lever arm 406.

Convergence lever arm 410 is in contact at a first end 480 with the second end 464 of front disparity lever arm 414 and is in contact at a second end 482 with end 470 of rear disparity lever arm 406. Thus, convergence lever arm 410 operates to translate pivotal movement of one of the rear and front disparity lever arms 406, 414 to the other with the relative magnitude of the pivotal movement determined by the position of convergence pivot truck 408 relative base member 402. Convergence pivot truck 408 includes ball bearings 490 which permit longitudinal movement of convergence pivot truck 408 relative base member 402.

Preloaded spring 418 is coupled between base member 402 and end 460 of front disparity level 414. It should be noted that, in order to maintain the effective points of origin of the imaging devices to be mounted on left and right camera trays 424 and 426 coincident to one another, rear disparity lever arm 406 and front disparity lever arm 414 should have an effective length equal to the optical distance between beam splitter 420 and mirror 422 to ensure that the imaging devices on trays 424 and 426 are offset one from another precisely that distance between the optical centers of beam splitter 420 and mirror 422.

Convergence adjustment 428 comprises a threaded rod coupled between base member 402 and convergence pivot truck 408 to permit selective movement of convergence pivot truck 408 relative base member 402. Disparity adjustment 430 comprises a threaded bolt mounted in base member 402 and adapted to engage end 474 of rear disparity lever 406 in order to permit selective pivotal movement of rear disparity lever 406.

Figure 10:
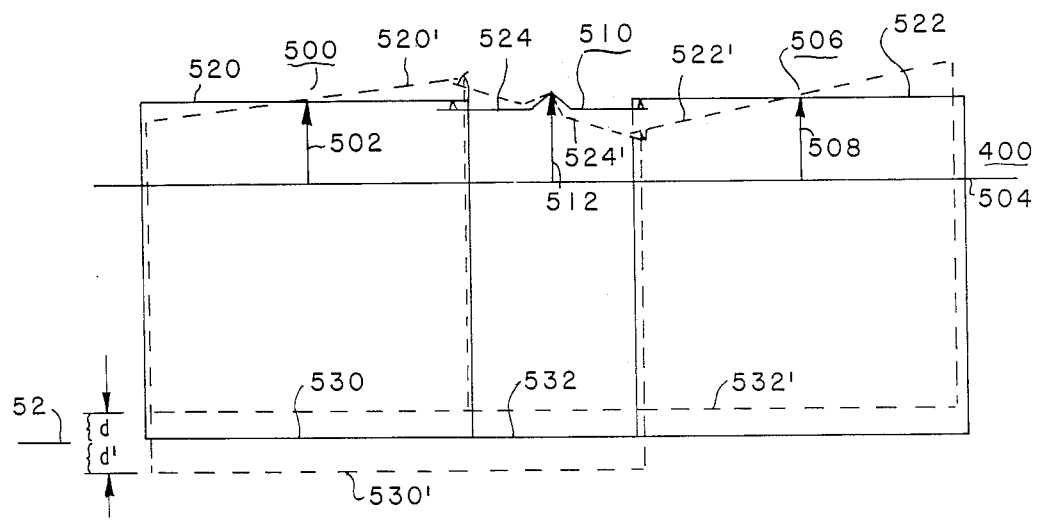
FIGS. 10, 11 and 12 provide schematic illustrations of the operation of the support apparatus illustrated in FIG. 9.
Figure 11:
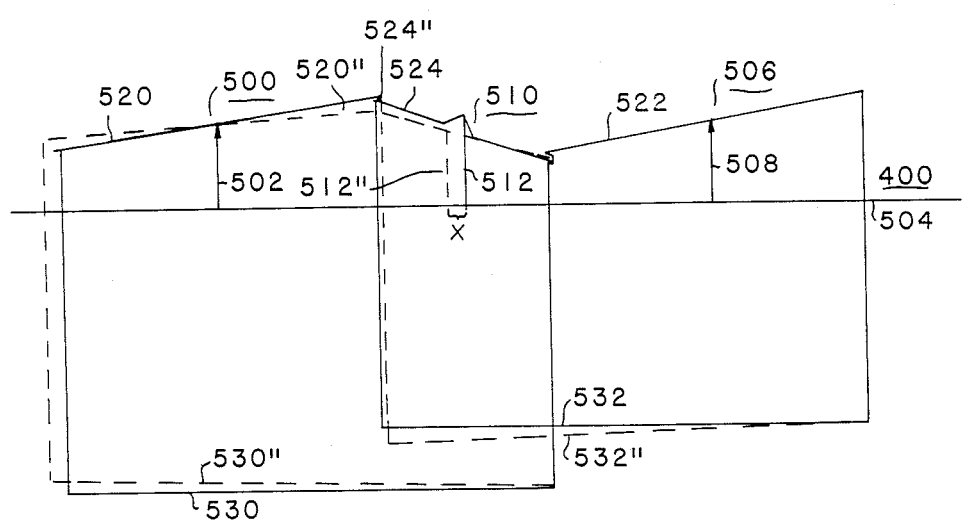
Figure 12:
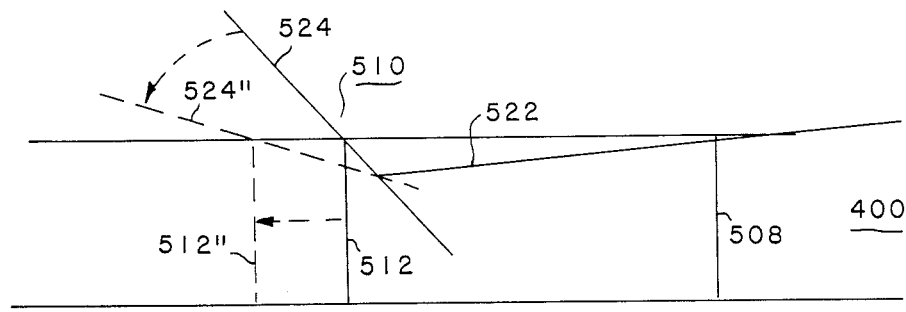

The operation of support apparatus 400 will now be described with reference to FIGS. 10, 11 and 12. As illustrated in Figs. 10, 11 and 12 support apparatus 400 may be considered as comprising a first pivot mechanism 500 having a base 502 coupled to a base member 504, a second pivoting mechanism 506 having a base 508 coupled to base member 504, and a third pivoting mechanism 510 having a base 512 coupled to base member 504. Pivoting mechanism 500 further includes a pivot arm 520 pivotably mounted on base 502. Pivoting mechanism 506 further includes a pivot arm 522 pivotably mounted on base 508. Pivoting mechanism 510 further includes a pivot arm 524 pivotably mounted on base 512. It should be noted that the plane of pivot arm 524 is located slightly below the pivot point of base 512, whereas the plane of pivot arms 520 and 522 is located at the pivot point of bases 502 and 508, respectively. The pivot points of bases 502, 508 and 512 all lie in approximately the same plane.

The front of pivot arm 520 supports the front of a first platform 530 corresponding to left tray 424, whereas the rear of pivot arm 520 supports the front of a second platform 532 corresponding to the right tray 426. The front of pivot arm 522 supports the rear of platform 530 whereas the rear of pivot arm 522 supports the rear of platform 532.

When platforms 530 and 532 are positioned as illustrated by the solid lines in FIG. 10, imaging devices on platforms 530 and 532 would have effective points of origin which are coincident one to the other. However, upon application of a counterclockwise pivotal rotation of arm 522 to the position illustrated by dotted line 522′, a resultant clockwise pivotal motion is imparted to pivot arm 524 resulting in the positioning of pivot arm 524 in the position indicated by dotted line 524′ and a counter-clockwise rotational movement is imparted in pivot arm 520 to position pivot arm 520 in the position indicated by dotted line 520′. The positions of pivot arms 520, 522 and 524 indicated by dotted lines 520′, 522′ and 524′ result in relative movement of platforms 530 and 532 to positions indicated by dotted lines 530′ and 532′. Thus, platforms 530 and 532 are separated by a distance d plus d′ and the corresponding effective points of origin of imaging devices located on platforms 530 and 532 are effectively located a distance d above a first line 52 connecting left and right points of origin of an observer and a distance d′ below line 52, respectively. Pivoting of arm 522 effectively results in altering the distances of the effective points of origin of the corresponding image devices above and below the first line connecting the left and right points of origin of an observer of the subject volume of which a three-dimensional illusion is to be obtained.

In FIG. 11, pivot arms 520, 522 and 524 are illustrated to be in the positions represented by dotted lines 520′, 522′ and 524′ of FIG. 10. FIG. 11 illustrates the effect of shifting base 512 of pivot mechanism 524 in a forward direction a distance X to a position indicated by dotted line 512″. The effect of this shift can be seen more clearly in FIG. 12, which is an enlargement of the connecting portions of pivoting mechanisms 506 and 510. As may be seen in FIG. 12, with pivot arm 522 in a fixed position (for example in response to operation of disparity adjustment 430 of FIGS. 8 and 9), shifting of base 512 in a forward direction to position indicated by dotted line 512″ results in effective rotation of pivot arm 524 in a counter-clockwise direction to a position indicated by dotted line 524″. This results in a relative decrease in the height of that end of pivot arm 524 which contacts pivot arm 520 of pivoting mechanism 500, thereby resulting in a clockwise rotation of pivot arm 520 to a position indicated by dotted line 520″ of FIG. 11. This new position of pivot arm 520 results in upper movement of the front end of platform 530 to a position of platform 530 indicated by dotted line 530″ and lowering of the front end of platform 532 to a position indicated by dotted line 532″ in FIG. 11. This relative raising of the front end of platform 530 and lowering of the front end of platform 532 may be dimensioned to result in the convergence of the optical paths of imaging devices positioned on platforms 530 and 532, respectively, in a manner whereby the effective points of origin of those imaging devices is maintained in the first plane defined above, namely the plane which contains the left and right points of origin of the observer of the three-dimensional illusion to be produced and which is normal to the optical axis of that observer.

It should be noted that, once convergence is established by movement of base 512 as indicated in FIG. 11, subsequent pivoting of pivot arm 522 will result in both an adjustment of the disparity between the distances d and d′ of platforms 530 and 532, while maintaining the convergence of the optical axes of the imaging devices mounted on platforms 530 and 532 in the same second plane as required above in accordance with the teachings of the method of the subject invention. Thus, support 400 provides a teeter-totter mechanism which, for practical purposes, may be utilized to implement the method of the subject invention.

The distances and angles shown in FIG. 10, 11 and 12 have been exaggerated for clarity. Preferably, these angles are sufficiently small such that pivot arm 520 moves substantially proportionately to movement of pivot arm 522 when disparity adjustment 430 is altered. As noted above, the proportionality of movement between pivot arms 520 and 522 is dependent on the position of base 512.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicants' inventive concept.

We claim:

1. A method for obtaining images for use in displaying a three-dimensional illusion of a subject volume having foreground and background portions as viewed by an observer having an optical axis directed toward said volume and having binocular vision originating at left and right points of origin, comprising the steps of:
   (a) obtaining a series of first images of said volume as viewed along a first optical axis having a first effective point of origin; and
   (b) obtaining a series of second images of said volume as viewed along a second optical axis having a second effective point of origin, with said first and second points of origin located in a first plane which includes said left and right points or origin and which is normal to said optical axis of said observer, said effective first and second points of origin vertically displaced from one another at equal distances above and below said optical axis of said observer, said first and second optical axes aligned to converge at a point of convergence in a second plane parallel to said first plane which second plane includes the foreground portion of said subject volume within the field of view of said observer which is closest to said first plane;
   (c) changing the distance between said first and second planes; and
   (d) adjusting substantially the point of convergence without refocusing to the new point of convergence to maintain said point of convergence in said second plane as said second plane moves relative to said first plane; whereby, upon alternate display of said first and second images, a three-dimensional illusion is produced with reduced rocking movement of objects in said foreground.

2. A method of claim 3 further comprising the step of focusing both said first and second images in a third plane in said volume parallel to and beyond said second plane.

3. A method of claim 1 further including the step of altering said equal distances of said effective points of origin in response to relative movement between said first plane and portions of said subject volume beyond said second plane.

4. A method of claim 1 further including the step of altering said equal distances of said effective points of origin in response to a change in the degree of relative movement between objects in said subject volume.

5. A method of claims 1 further including the step of altering said equal distances of said effective points or origin in response to a change in the distance between said first and second planes.

6. A method of claims 1, 2, 3, 4 or 5 including the step of sequentially displaying on a viewing surface said first and second images of said subject volume from said first point of origin and then, time displaced, from said second point of origin at a rate within a range of 4 to 30 changes between said first and second points of origin per second.

7. A method of claim 6 wherein said step of displaying includes altering said rate of changes.

8. A method of claim 1 wherein said first and second effective points of origin have a maximum spacing substantially equal to a normal human interocular distance of approximately 65 millimeters.

9. A method of claim 1 including at least two of the following additional steps:
   (a) altering said equal distances of said effective points of origin in response to relative movement between said first plane and portions of said subject volume beyond said second plane.
   (b) altering said equal distances of said effective points of origin in response to a change in the degree of relative movement between objects in said subject volume; and
   (c) altering said equal distance of said effective points of origin in response to a change in the distance between said first and second planes.

10. An image recording medium upon which a first and second set of a series of first and second images have been stored for use in displaying a three-dimensional illusion of a subject volume having foreground and background portions as viewed by an observer having an optical axis directed toward said volume and having binocular vision originating at left and right points of origin all of said first images being of said volume as viewed along a first optical axis having a first effective point of origin; and all of said second images being of said volume as viewed along a second optical axis having a second effective point of origin, with said first and second points of origin located in a first plane which includes said left and right points of origin and which is normal to said optical axis of said observer, said first and second points of origin vertically displaced from one another at equal distances above and below said optical axis is of said observer, said first and second optical axes aligned to converge at a point of convergence in a second plane parallel to said first plane which second plane includes the foreground portion of said subject volume within the field of view of said observer which is closest to said first plane, said first set of images having a first distance between said first and second planes and said second set of images having a substantially different second distance between said first and second planes, said first and second sets of said series of images having a common focus but substantially different points of convergence to maintain said point of convergence in said second plane as said second plane moves relative to said first plane; whereby, upon alternate display of said first and second images, a three-dimensional illusion is produced with reduced rocking movement of objects in said foreground.

11. An image recording medium of claim 10 wherein both said first and second images are focused in a third plane in said subject volume parallel to and beyond said second plane.

12. An image recording medium of claim 10 wherein said equal distances of said effective points of origin are changed in response to at least one of the following:
   (a) movement between said first plane and those portions of said subject volume beyond said second plane;
   (b) a change in the degree of relative movement between objects in said subject volume; and
   (c) a change in the distance between said first and second planes.

* * * * *